Figure 1:
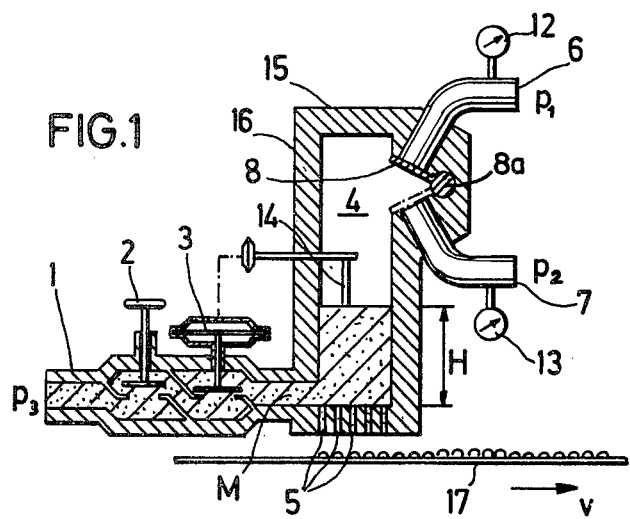

United States Patent [19]

Weinhold

[11] 4,156,495

[45] May 29, 1979

[54] METHOD FOR PRODUCING DROPS OR PORTIONS OF LIQUID AND VISCOUS MATERIALS AND FOR PRODUCING PELLETS THEREFROM

[75] Inventor: Otto Weinhold, Vienna, Austria

[73] Assignee: Sandco Limited, Ottawa, Canada

[21] Appl. No.: 815,011

[22] Filed: Jul. 12, 1977

Related U.S. Application Data

[63] Continuation of Ser. No. 589,083, Jun. 23, 1975, abandoned.

[30] Foreign Application Priority Data

Jun. 24, 1974 [AT] Austria .................. 5186/74

[51] Int. Cl.² .................. B29F 3/06
[52] U.S. Cl. .................. 222/1; 222/394; 222/422; 264/9; 264/13; 425/DIG. 230
[58] Field of Search .................. 264/9, 13; 425/DIG. 230; 222/420, 394, 395, 401, 386.5, 339, 422, 1; 346/75

[56] References Cited

U.S. PATENT DOCUMENTS

| | | | |
|---|---|---|---|
| 1,393,383 | 10/1921 | Linebarger | 264/13 |
| 2,931,067 | 4/1960 | Delaloye et al. | 264/14 |
| 3,208,101 | 9/1965 | Kaiser et al. | 264/13 |
| 3,484,793 | 12/1969 | Weigl | 346/75 |
| 3,970,222 | 7/1976 | Duffield | 222/420 X |

FOREIGN PATENT DOCUMENTS 584245 9/1959 Canada .................. 264/13

Primary Examiner—David A. Scherbel
Attorney, Agent, or Firm—Harold L. Stults; Pasquale A. Razzano

[57] ABSTRACT

A method for pelletizing liquid and viscous products. A body of the liquid or viscous material is enclosed within a chamber having discharge orifices or nozzles at the bottom of the body of liquid. There is a body of gas above the liquid which is subjected alternately to increased and decreased gas pressures so that the pressure on the body of liquid is first above and then below atmospheric pressure. That causes the product to be discharged from the orifices in droplets. The droplets are then solidified to form pellets. A predetermined liquid level is maintained within the chamber. The changes in gas pressure are produced by operating a valve which connects the body of gas in the chamber alternately to a suction line and supply line for gas under pressure.

6 Claims, 3 Drawing Figures

U.S. Patent   May 29, 1979   4,156,495

METHOD FOR PRODUCING DROPS OR PORTIONS OF LIQUID AND VISCOUS MATERIALS AND FOR PRODUCING PELLETS THEREFROM

This is a continuation of application Ser. No. 589,083 filed June 23, 1975, and now abandoned.

This invention relates to methods and systems for producing drops or discrete portions of materials in liquid or viscous forms, and more in particular to producing pellets from such materials.

An object of this invention is to provide improved methods for discharging precisely-controlled portions or drops of liquids and viscous materials. A further object is to produce pellets from such portions or drops of the materials. Another object is to provide an improved method and system for producing solidified portions of products from liquid and viscous phases of the materials. A still further object is to provide for the above with apparatus which is efficient, dependable, and adaptable to various conditions of operation and use. These and other objects will be in part obvious and in part pointed out below.

Figure 2:
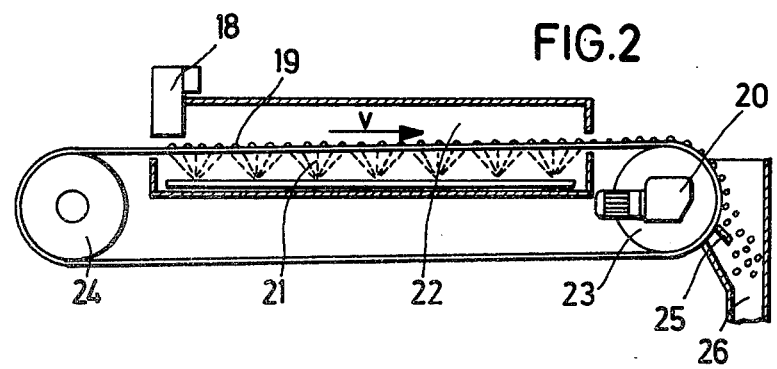
Figure 3:
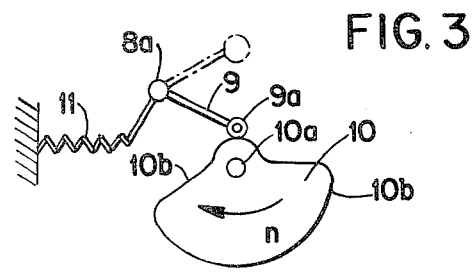

In the drawings:

FIG. 1 is a schematic side-elevation of a system for practicing a method constituting one embodiment of the invention; and, FIG. 2 is a similar view on a reduced scale which includes a showing of the system for cooling the products which are formed in the system in FIG. 1; and, FIG. 3 is a schematic side view of the apparatus used to vary the pressure to which the liquid or viscous material is subjected during the pellet forming process.

Referring to FIG. 1 of the drawings, a unit 18 has a heat-insulated wall structure 16 forming a closed chamber 4 which contains a body of a liquid material to be treated. The space in chamber 4 above the liquid is occupied by a body of gas of controlled pressure. In this embodiment, the body of gas in chamber 4 is nitrogen, although with many materials air may be used. The liquid level in chamber 4 is maintained at H by supplying the liquid from a source $P_3$ through a supply conduit 1, a manual shut-off valve 2 and a liquid-level control valve 3. Valve 3 is open to feed liquid to chamber 4 by the action of a controller 14 of known construction. The bottom wall of chamber 4 has a plurality of orifices or nozzles 5 through which the material being treated is discharged in a precisely controlled manner.

The control of the discharge of the material is effected by varying the pressure of the body of gas in chamber 4. When that gas pressure is increased, the liquid starts to flow from nozzles 5; and, when that pressure is reduced, the flow is stopped and a portion or drop of the material is discharged from each nozzle. Those pressures are varied alternately between super-atmospheric and subatmospheric values so that the liquid first starts to flow from each nozzle and is then drawn back into the nozzle. The arrangement and the cyclic timing are such that a discrete portion or drop of the liquid emerges from the nozzle during each super-pressure impulse and is not drawn back during the next subatmospheric impluse. Hence, for each cycle of super-atmospheric and subatmospheric pressures, each nozzle discharges a single drop of the liquid and the drop falls downwardly onto a steel belt run 17. The action is rapid and continuous, and belt 17 moves to the right at a rate sufficient to provide a continuous single layer of the drops on the belt.

The variations in gas pressure in chamber 4 are caused by connecting the chamber alternately to conduits 6 and 7. Conduit 6 supplies gas to the chamber at a super-atmospheric pressure $P_1$, and conduit 7 withdraws gas from the chamber at a subatmospheric pressure $P_2$. A butterfly valve 8 has positions, the one shown in broken lines wherein conduit 6 is open to chamber 4 and the valve closes the end of conduit 7 to chamber 4. In the alternate position of the valve, shown in full lines, conduit 7 is open to chamber 4 and conduit 6 is closed to chamber 4. Hence, in the broken-line position of valve 8, chamber 4 is subjected to super-atmospheric pressure $P_1$, and in the full-line valve portion of the valve, chamber 4 is subjected to subatmospheric pressure, thus producing the cyclic variation in the gas pressure in chamber 4 discussed above.

The operating mechanism for valve 8 is represented schematically in FIG. 3, and comprises an operating arm 9 mounted upon the valve shaft 8a and carrying a cam follower roller 9a which rests upon the cam surface 10b of a cam 10. A tension spring 11 is anchored at one end and has its other end connected to a spring arm 11a which is fixed to shaft 8a. With the cam surface 10b shown, the rotation of cam 10 about the axis of shaft 10a swings arm 9 rapidly up and down between the full-line and broken-line positions shown. When arm 9 is in the full-line position, valve 8 is in its full-line position in which conduit 6 is closed and conduit 7 is open to chamber 4. When arm 9 moves to its broken line position, valve 8 is swung to its broken line position so that conduit 6 is open to chamber 4 and conduit 7 is closed. It is seen that the continuous rotation of cam 10 produces the rapid fluctuations in the gas pressure in chamber 4 as discussed above. It should be noted that the dwells on cam 10 are such as to hold valve 8 in each of its positions for a controlled period of time. In this embodiment, valve 8 is held in the full-line position so as to open the chamber to conduit 7 for a longer period of time than conduit 6 is open to the chamber. The relative times that the two conduits are open to the chamber is varied to provide optimum operating conditions of the particular system and the material being treated. As indicated above, the system and method disclosed are such that a drop or portion of the liquid is discharged from each nozzle 5 when arm 9 and valve 8 are through the operating cycle represented in the drawing. The discharging of the liquid from chamber 4 opens valve 3 sufficiently to maintain the desired liquid level in the chamber. Gages 12 and 13 indicate the gas pressures in the respective conduits 6 and 7.

Referring to FIG. 2, the complete system of FIG. 1 is represented at 18, and belt 17 is the upper run of an endless belt 19, which is mounted upon a pair of pulleys 23 and 24. Belt 19 is driven by an electric motor and gear reduction unit 20 through the shaft of pulley 23. The material portions are cooled by a water or brine spray 21 in a tunnel 22 directed onto the bottom of belt run 17. As the portions reach the right-hand end of belt run 17, they are completely solidified as pellets and are pealed from the belt by the bending of the belt as it passes around the pulley. The pellets fall into a hopper 26, and a doctor blade 25 cleans the belt, and insures that all of the pellets are discharged.

The invention contemplates that the drops or portions of the material can be solidified in various ways, for example, solely by contact with air or by direct contact with a liquid. Also, the endless belt can be replaced by a rotating plate. The material may be of a type which is solidified by a chemical reaction or by crystallization. It should be noted that in the present embodiment, the body of the liquid contacts only the fixed walls of chamber 4 and the fixed nozzles, and the valve 8 contacts only the gas. That avoids many problems which are encountered with some systems which have been developed for the same and similar uses. The material treated is understood to be various liquids which are materials having substantially definite volume but no definite form. Particularly, the liquids form droplets when a small portion is discharged into the atmosphere or another fluid for solidification, and which have been termed "viscous materials". In the illustrative embodiment, the material is discharged through open nozzles into the ambient atmosphere, and flows from the chamber whenever the pressure in chamber 4 is above the atmospheric pressure; and, it flows from the nozzles back into the chamber whenever the pressure within the chamber is below the atmospheric pressure. That is, the successive cycles of pressure variations in the body of gas within chamber 4 is between a value greater than the predetermined pressure at the discharge ends of the nozzles so that the liquid flows outwardly from the chamber, and a value below that predetermined pressure, so that the flow is from the nozzles back into the chamber.

The maintenance of the fixed liquid also maintains a fixed volume of air in chamber 4, and the size and shape of the chamber does not vary during operation. Hence, the cyclic opening of conduits 6 and 7 to the chamber produces a uniform wave motion in the gas movement in the chamber. That in turn produces identical cycles of the pressures exerted on the surface of the body of the liquid, thus insuring the uniform liquid discharge and withdrawal actions within each of the nozzles during each cycle. The fluid-to-fluid contact between the gas and liquid causes the pressures exerted upon the surface of the liquid by the gas to be distributed, so that those pressures do not produce a horizontal wave motion in the liquid in the vicinity of the nozzles. Hence, the pressure variations produce only the desired flow into each of the nozzles and the vertical movements within the nozzles.

The size of the material portions which drop from the nozzles is controlled by varying the gas pressure in conduit 6 and varying the effective time of the cycle during which conduit 6 is open to chamber 4. Increasing either that pressure or that effective time acts to increase the size of those material portions. It has been indicated above that the material in the nozzles tends to move back into chamber 4 when the chamber is connected to conduit 7 and closed to conduit 6. When the production of pellets is discontinued while a body of the material is in chamber 4, valve 8 is moved to the full-line postion of FIG. 1 so as to open conduit 7 to the chamber, and that withdraws the material from the nozzles and prevents leakage of the material from the chamber.

The invention contemplates that there will be modifications of the construction and other embodiments within the scope of the claims. For example, in the illustrative embodiment conveyor 19 may be removed so that the material portions drop through air and are solidified while dropping, and the pellets are collected in a hopper. In such case, the solidifying can be by an internal reaction in the material or by air cooling. The material portions can also be dropped into a body of liquid, when appropriate.

What is claimed is:

1. The method of producing discrete drops of a liquid material comprising, the steps of, confining a body of the material having a top surface within a closed space having a discharge opening to which said material is exposed below said top surface and through which the material will flow into a discharge zone, maintaining a body of gas within said space having fluid-to-fluid contact with said body of material along said top surface, and producing successive cycles of pressure variations in said body of gas, each of said cycles comprising first delivering additional gas to said body of gas to increase the pressure of the body of gas above the pressure which is at the discharge zone of said opening for a period of time sufficient to cause a specific quantity of the material to be discharged from said opening and form a drop thereof, and then discharging gas from said body of gas in said closed space to reduce said pressure below the pressure at said discharge zone to cause the material in said opening to move back from said drop into said space, whereby said drop is disconnected from the material at said opening.

2. The method as defined in claim 1 which includes the step of, flowing a stream of said material into said body of material to replace the material discharged therefrom and thereby maintain the quantity of said body of material within a predetermined quantity range.

3. In a method of forming pellets from liquid materials, the steps of, confining a body of the material having a top surface and a body of gas under pressure above and in contact with the top surface of the body of material in a space which is closed except for a plurality of orifices and gas inlet and discharge openings and a material supply opening, each of said orifices being open to said body of material and having an outlet from which the material is discharged when the pressure on the body of material is above the pressure at said outlet, said gas inlet and outlet openings being connected to said body of gas whereby gas may be added to and withdrawn from said body of gas, said material supply opening being adapted to replace the material discharged through said orifices, supplying additional gas to said body of gas and withdrawing gas from said body of gas in a series of cycles, each of said cycles comprising first increasing the pressure exerted upon the top surface of the body of material by the body of gas at the beginning of each cycle above the pressure at the outlets of said orifices and then reducing said pressure exerted upon the top surface of the body of material to a value less than said pressure at said outlets of said orifices to complete the cycle, controlling the respective pressures and the time of the steps of each cycle to cause the material to flow through said orifices and form a droplet at the outlet of each orifice during the period in each cycle when said pressure is increased and to draw the material within each orifice back toward the body of material during the period when said pressure is reduced whereby the material within each orifice is disconnected from the droplet which is formed at its outlet and the droplet falls therefrom by the action of gravity, and adding material to the body of material as is required to maintain the desired operating conditions.

4. The method of producing droplets from a liquid material which comprises, the steps of, confining a body of the material and a body of gas with the bodies of material and gas being in direct contact throughout a common area whereby the pressure of the material is increased and decreased by changes in the pressure of the body of gas, providing discharge orifices each of which is adjacent the body of material and has a discharge outlet from which the material flows when the pressure exerted upon the body of material is greater than or equal to the pressure at said outlets, producing cycles of variations of the pressure of said body of gas with each cycle comprising the first step of adding additional gas to the body of gas by a quantity sufficient to increase the pressure above the pressure at said outlets of said orifices with the pressure being of a range and for a period sufficient to cause a droplet of said material to form at said outlet of each of said orifices and a second step which comprises withdrawing gas from said body of gas by a quantity sufficient to reduce the pressure of said body of gas below the pressure at said outlets of said orifices and for a sufficient period of time to withdraw said material from each of said orifices and thereby disconnect the material in each orifice from the droplet formed at its outlet whereby the droplets move downwardly from said orifices by the action of gravity, and replenishing the material in said body of material as required to maintain uniform operating conditions.

5. The method as described in claim 4, which includes the step of, solidifying said droplets to form pellets.

6. In a method of producing discrete drops of a liquid material, carrying on continuous series of steps with each series comprising the steps of, confining a body of the material and a body of gas within a closed space, said body of the material having a top surface and said body of gas having a bottom surface with said surfaces being coextensive whereby the pressure of said body of gas is exerted upon said body of liquid uniformly throughout said surfaces, said closed space having a discharge opening to which the said material is exposed below said top surface and through which the material will flow into a discharge zone, and producing successive cycles of pressure variations in said body of gas, each of said cycles comprising first delivering additional gas to said body of gas to increase the pressure of the body of gas above the pressure at said discharge zone of said opening for a period of time sufficient to cause a controlled quantity of the material to be discharged from said opening which is sufficient to form a drop thereof, and then discharging gas from said body of gas to reduce said pressure in said closed space below the pressure at said discharge zone to cause material in said opening to move back from said controlled quantity into said space, whereby said controlled quantity forms a drop when disconnected from the material at said opening.

* * * * *